United States Patent Office 3,428,396
Patented Feb. 18, 1969

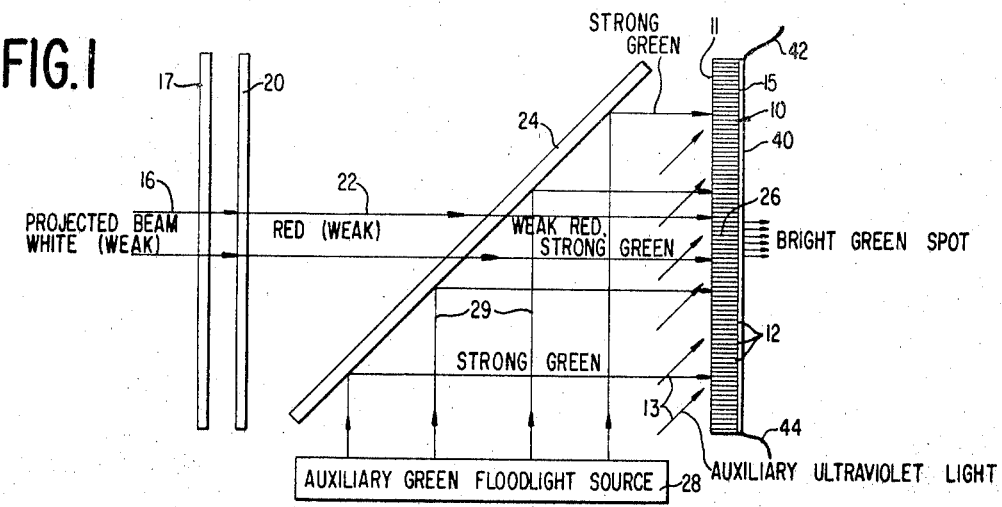
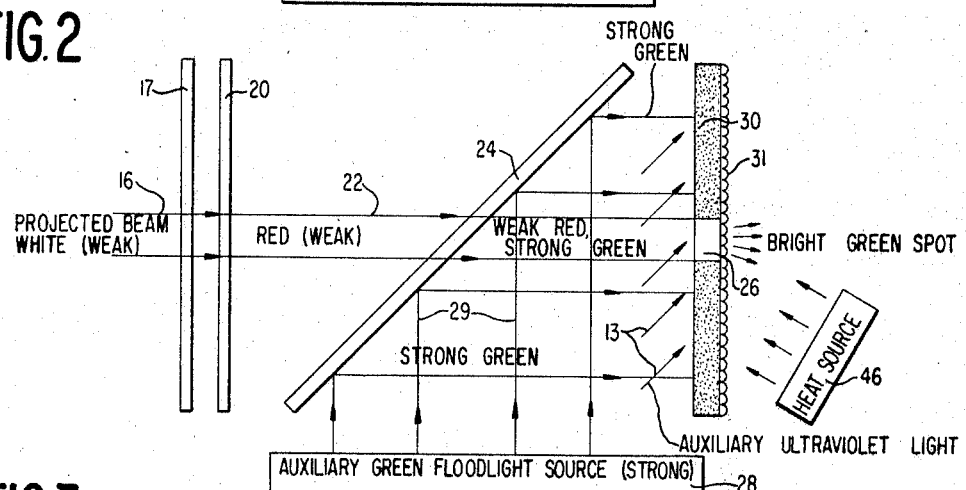
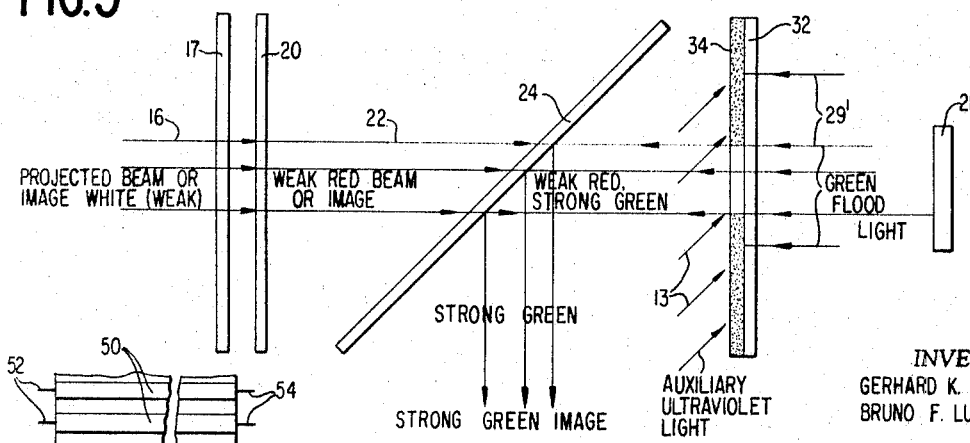

3,428,396
PHOTOCHROMIC GLASS IMAGE DISPLAY AND STORAGE SYSTEM
Gerhard K. Megla, Raleigh, N.C., and Bruno F. Ludovici, Owego, N.Y., assignors to Corning Glass Works, Corning, N.Y., a corporation of New York
Continuation-in-part of application Ser. No. 519,052, Jan. 6, 1966. This application Jan. 11, 1968, Ser. No. 697,155
U.S. Cl. 353—29          13 Claims
Int. Cl. G03b *21/60*

ABSTRACT OF THE DISCLOSURE

An image display and storage system is provided with a photochromic glass plate constructed of a plurality of parallel equal length glass fibers. The photochromic glass plate is first exposed to blue or ultraviolet light to uniformly darken the photochromic glass. Information in the form of red light or heat is then applied to the photochromic glass to selectively bleach portions of the photochromic glass plate. The image may be intensified and viewed by directing green light against the glass plate which will pass through the bleached areas of the photochromic glass plate.

Related application

This application is a continuation-in-part of applicants' copending application Ser. No. 519,052 filed Jan. 6, 1966, now abandoned.

BACKGROUND OF THE INVENTION

Field of the invention

The present invention is directed to an improved image display and storage system which incorporates a photochromic glass plate in which the image is either displayed immediately or stored for future use and subsequently displayed.

Prior art

The use of photo-metachromatic material and photochromic glass are well known in the art. Both of these substances are normally transparent but may be rendered opaque if irradiated with blue or ultraviolet light. The opaque condition may be erased or bleached upon the application of heat or red light. By using these properties an image may be placed in the material which may be viewed or read out by applying green light to the material since green light will not affect the opaqueness of the material but will pass through those areas which have been bleached.

Summary of the invention

The present invention utilizes these properties by placing the photochromic glass plate in a system whereby the glass is exposed to light in the blue, green and red range. The blue or ultraviolet light directed on the photochromic glass will darken the glass and the red light containing the desired information will bleach a portion of the photochromic glass to enable the green light to pass therethrough and present the information as a green image.

The photochromic glass plate of the present invention may be arranged with the appropriate filters and dichroic mirrors so as to enable the plate to be used either as a rear or front projection screen. Also the photochromic glass plate may be a smooth homogeneous plate of photochromic glass, a homogeneous plate of photochromic glass with one surface thereof frosted or roughened or a photochromic glass fiber optics plate. The fiber optics plate possesses certain image-intensifying properties as well as greatly improved resolution. In the fiber optics plate, the optical fibers will isolate individual picture elements from each other and confine the scattered energy within each element.

Depending upon the relaxation properties of the particular photochromic glass used, the image, or optical memory information can be stored for periods ranging from a few seconds to several weeks. For this storage mechanism to be fully effective, the glass would have to be shielded from any stray red or ultraviolet illumination. The green illumination by itself is all that would be needed to recover the information.

Other objects, advantages and features will become apparent from consideration of the following description when taken in conjunction with depending claims and the drawings wherein:

FIGURE 1 is a schematic view of the display system utilizing a fiber optics screen as a rear projection screen;

FIGURE 2 is a schematic view of a modified system using the homogeneous photochromic glass screen having a roughened surface as a rear projection screen;

FIGURE 3 is a schematic view of a modified system utilizing a photochromic glass plate as a front view screen; and FIGURE 4 is a front view of a modified screen construction.

The present invention with respect to an information display and storage system comprises a photochromic glass screen, a first light source means directed against said screen to darken said screen, second light source means for producing and directing information containing light against said screen to bleach selected areas of said screen and a third light source means having a wave length intermediate the wave lengths of said first and second sources directed against said screen whereby said bleached areas will be illuminated by said third light source means to provide an information display.

Referring now to FIGURE 1, a system embodying the present invention is shown therein with a photochromic glass fiber plate indicated at 10 comprised of a plurality of glass fibers 12 of photochromic material. The fibers 12 are arranged in parallel relationship with the opposite ends thereof forming the front surface 11 and rear surface 15 of the screen 10.

Each of the fibers is provided with a passive coating of low refractive index. By using a fiber plate the boundaries of the image are more clearly defined and the resolution of the image is far superior to that achieved by using a homogeneous photochromic glass plate.

A source of ultraviolet light directs the ultraviolet waves 13 against the entire front surface 11 in order to darken the photochromic glass of the screen. A source of white light projects a weak beam of light 16 through the information source such as a film or the like 17. The information beam of weak white light is then projected through a red transmitting filter 20 to provide an information beam of weak red light. The red information beam 22 is subsequently passed through a dichroic mirror 24, which is adapted to transmit red light and reflect green light, upon the front surface of glass fiber plate 10. The red information containing beam of light then bleaches the corresponding area of the fiber plate 10 as indicated at 26. An auxiliary green flood light source 28 projects a strong green light beam 29 which is reflected from the dichroic mirror 24 onto the front surface of the photochromic glass fiber plate. The green light will pass through those areas of the photochromic glass fiber plate which have been bleached by the red light and on the rear viewing side 15 of the screen 10 the information as contained in the information light beam 16 will appear as a bright green spot 26.

In the embodiment shown in FIGURE 2 the filter, the dichroic mirror, the light sources and the screen are all arranged in the same manner as shown in FIGURE 1. However, in this embodiment a homogeneous photochromic glass plate 30 with the viewing surface roughened as at 31 is utilized. Such a surface will disperse the green image for wide angle viewing.

In the modification shown in FIGURE 3, the system is so arranged that the intensified image will be viewed from the same side of the screen onto which the weak image is projected. To accomplish this a dichroic mirror 32 which transmits green light and reflects red light is superimposed on the rear surface of the photochromic glass plate 34. The green flood light source 28' is also placed on the same side of the photochromic glass plate 34 as the red reflecting dichroic mirror 32. Thus the weak red beam 22 which contains the image is passed through the dichroic mirror 24 and bleaches the image area in the photochromic glass plate 34. The weak red beam is then reflected from the dichroic mirror 32 and passes back through the photochromic glass plate. The green light 29' is then passed through the dichroic mirror 32 and the bleached image area in the photochromic glass plate and is reflected from the dichroic mirror 24 to provide an image of the information on the front side of the screen. The advantage of this arrangement is that the photochromic glass is exploited more efficiently inasmuch as the weak bleaching beam traverses it twice. The photochromic glass plate 34 utilized in the system of FIGURE 3 may be either a smooth homogeneous photochromic glass plate, a homogeneous surface treated photochromic glass plate as shown in FIGURE 2 or a photochromic fiber optics plate as shown in FIGURE 1. If the light passing range of the dichroic mirror 32 extends from the green into the near ultraviolet range, it would be possible to place the auxiliary ultraviolet light on the same side of the mirror 32 as the green light. In this way the ultraviolet light would pass through the mirror 32 to darken the photochromic glass plate 34.

Due to the nature of the photochromic glass fiber optics screen the image of the information may be stored for periods ranging from a few seconds to several weeks depending upon the particular properties of the photochromic glass used and the environment of the system. In order to store the information the screen would have to be isolated from any ultraviolet light source which would subsequently darken the entire screen. When it is desired to recover the information stored in the photochromic glass plate it is only necessary to flood the screen with the green light, thereby presenting a bright green image of the information on the screen.

In addition to bleaching the photochromic glass plate by means of red light it is also possible to bleach or render the entire glass plate transparent by the application of heat thereto.

In FIGURE 1 a very thin, transparent electro-conductive coating 40 has been placed on the rear surface 15 of the plate. Suitable electrodes 42 and 44 may be connected thereto and upon connection of these electrodes to a suitable source of electric power (not shown) the coating 40 will be heated thereby applying heat to the plate to bleach the photochromic glass.

A modified form of heating is shown in FIGURE 2 wherein a heat source such as an infrared lamp or the like may be placed in proximity to a surface of the glass screen to direct heat to the photochromic glass for the bleaching thereof.

The application of heat as described above is generally used to render the entire plate transparent thereby erasing all images therein so that the plate may be reused. It is contemplated, however, that by the use of suitable screens, images could also be formed in the glass plate by the application of heat.

FIGURE 4 shows a modified screen construction wherein an electro-conductive coating 50, similar to the coating 40 in FIGURE 1, is placed on the screen in spaced parallel strips. Each strip 50 is provided with electrical leads 52 and 54 which may be connected to any suitable selective switching arrangement so that any strip or combination of strips may be energized to heat bleach the photochromic glass thereunder. The strips 50 could be disposed in other configurations and are capable of being placed on either surface of the screen. For example, the strips 50 could be placed on the surface 11 of the screen 10 in FIGURE 1 opposite from the coating 40 or vice versa.

Although FIGURES 1, 2 and 3 are directed to a system wherein information is bleached into the photochromic glass plate by a beam of red light, a slight modification to the apparatus shown in these figures would permit information to be written into the plate by darkening selected portions thereof. For example, the system of FIGURE 2 could be modified by replacing the filter 20 with an ultraviolet transmitting filter, replacing the dichroic mirror 24 with one which passes ultraviolet light and reflects green light, and replacing the auxiliary ultraviolet light shown by the arrows 13 with an auxiliary red light source. Such a modification would permit the entire photochromic glass plate to be bleached by the auxiliary red light or by the heat from the source 46. The information containing ultraviolet beam would pass through the dichroic mirror and darken selected portions of the previously bleached photochromic glass plate. Green light from the source 28 would then illuminate the photochromic glass plate to provide a dark on light image instead of the previously described light on dark image.

With the present disclosure in view, modifications of the invention will appear to those skilled in the art and accordingly it is not desired to be limited to the exact details of the above illustrated embodiments.

What is claimed is:
1. An information display and storage system comprising a photochromic glass screen, first source means for producing and directing light against said screen to darken said screen, second source means for producing and applying radiant energy to said screen in a predetermined pattern to bleach selected areas of said screen, and a third source means for producing and directing light having a wave length intermediate the wave lengths of the light of said first source means and the radiated energy of said second source means against said screen to illuminate said bleached areas without affecting the photochromic glass of said screen to provide an information display.

2. An information display and storage system according to claim 1 wherein said screen is comprised of a plurality of equal length parallel glass fibers of photochromic glass, the ends of said fibers lying in parallel planes to define the front and rear of said screen.

3. An information display and storage system according to claim 1 wherein said first source means produces ultraviolet light radiation and said second source means produces infrared radiation.

4. An information display and storage system according to claim 1 wherein all of said source means are located on the same side of said screen whereby the information may be viewed from the opposite side of said screen.

5. An information display and storage system according to claim 1 wherein said first and second source means are located on one side of said screen and said third source means is located on the opposite side of said screen whereby the information may be viewed on said one side of said screen.

6. An information display and storage system according to claim 1 wherein said screen is comprised of homogeneous photochromic glass plate.

7. An information display and storage system according to claim 6 wherein one surface of said plate has a matte finish.

8. An information display and storage system according to claim 1 wherein said second source means is comprised of a light source capable of producing light having relatively long wave lengths in the infra-red range.

9. An information display and storage system according to claim 1 wherein said second source means is comprised of a heat source.

10. An information display and storage system as set forth in claim 9 wherein said heat source comprises an electro-conductive coating on said screen.

11. An information display and storage system as set forth in claim 1 further comprising additional radiant energy source means for bleaching the entire screen to erase previously recorded information.

12. An image display and storage screen comprising a plate having a plurality of parallel photochromic glass fiber rods each provided with a passive coating having a low refractive index and secured together in side by side relation with ends of said rods forming the surfaces of said plate.

13. An information display and storage system comprising a photochromic glass screen, means for producing and applying radiant energy to said screen to bleach said screen, first light source means for producing and directing a first light to said screen in a predetermined pattern to darken selected areas of said screen, and a second light means for producing a second light having a wave length intermediate the wave lengths of said radiant energy and said first light directed against said screen whereby the bleached areas will be illuminated to provide an information display.

References Cited

UNITED STATES PATENTS

| | | | |
|---|---|---|---|
| 3,085,469 | 4/1963 | Carlson | 88—24 |
| 3,269,847 | 8/1966 | Cohen | 350—160 |
| 3,323,244 | 6/1967 | Schreiber | 350—160 |
| 3,327,120 | 6/1967 | Weiss | 250—71 |

NORTON ANSHER, *Primary Examiner.*

RICHARD M. SHEER, *Assistant Examiner.*

U.S. Cl. X.R.

250—71; 353—84; 350—1, 96, 160